United States Patent
Rama et al.

(10) Patent No.: US 9,038,030 B2
(45) Date of Patent: May 19, 2015

(54) METHODS FOR PREDICTING ONE OR MORE DEFECTS IN A COMPUTER PROGRAM AND DEVICES THEREOF

(71) Applicant: Infosys Limited, Bangalore (IN)

(72) Inventors: Girish Maskeri Rama, Bangalore (IN); Himanshu Tyagi, New Delhi (IN); Thomas Weibel, Bad Ragaz (CH); Donggun Yoo, Seoul (KR)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/946,715

(22) Filed: Jul. 19, 2013

(65) Prior Publication Data

US 2014/0033176 A1    Jan. 30, 2014

(30) Foreign Application Priority Data

Jul. 26, 2012    (IN) .......................... 3053/CHE/2012

(51) Int. Cl.
    *G06F 9/45*    (2006.01)
    *G06F 11/36*   (2006.01)
    *G06F 11/00*   (2006.01)

(52) U.S. Cl.
    CPC .......... *G06F 11/3688* (2013.01); *G06F 11/008* (2013.01)

(58) Field of Classification Search
    USPC ....................................................... 717/124
    See application file for complete search history.

(56) References Cited

U.S. PATENT DOCUMENTS

| | | | |
|---|---|---|---|
| 5,655,074 A | 8/1997 | Rauscher | |
| 5,822,218 A * | 10/1998 | Moosa et al. .................. | 716/52 |
| 6,128,773 A * | 10/2000 | Snider ........................... | 717/132 |
| 6,477,471 B1 * | 11/2002 | Hedstrom et al. ............ | 717/135 |
| 6,895,577 B1 | 5/2005 | Noble et al. | |
| 7,434,202 B2 | 10/2008 | Kramer | |
| 7,490,319 B2 | 2/2009 | Blackwell et al. | |
| 7,747,987 B1 * | 6/2010 | Akarte et al. ................. | 717/131 |
| 8,015,055 B2 * | 9/2011 | Makita et al. ................ | 705/7.38 |
| 8,296,724 B2 * | 10/2012 | Lindley ......................... | 717/104 |
| 8,418,147 B1 * | 4/2013 | Odenwelder et al. ........ | 717/128 |
| 8,627,287 B2 * | 1/2014 | Fanning et al. ............... | 717/124 |
| 2004/0205717 A1 * | 10/2004 | Chiang et al. ................. | 717/124 |
| 2005/0071807 A1 * | 3/2005 | Yanavi ......................... | 717/104 |
| 2008/0178155 A1 * | 7/2008 | Gogh et al. ................... | 717/125 |
| 2009/0133006 A1 * | 5/2009 | Cheung ......................... | 717/144 |
| 2009/0144698 A1 * | 6/2009 | Fanning et al. ............... | 717/120 |
| 2010/0251215 A1 | 9/2010 | Yawalkar et al. | |

(Continued)

OTHER PUBLICATIONS

Pulawski, "Software Defect Prediction Based on Source Code Metrics Time Series", 2011, Springer-Verlag, pp. 104-120.*

(Continued)

*Primary Examiner* — Anna Deng
*Assistant Examiner* — Junchun Wu
(74) *Attorney, Agent, or Firm* — LeClairRyan, a Professional Corporation

(57) ABSTRACT

A method, non-transitory computer readable medium, and apparatus that obtains a version history for a plurality of source code files associated with the computer program. At least one defect probability value is generated for each of the plurality of source code files using at least one metric and the obtained version history. One or more of the plurality of source code files having a higher risk of including one or more defects than one or more other of the plurality of source code files are identified based on the generated defect probability values. Information regarding each of the one or more identified source code files is output.

15 Claims, 6 Drawing Sheets

(56) References Cited

U.S. PATENT DOCUMENTS

2010/0325613 A1* 12/2010 Bush et al. .................... 717/120
2012/0117476 A1* 5/2012 Siegrist et al. ................ 715/733
2013/0174122 A1* 7/2013 Watters et al. ................ 717/121

OTHER PUBLICATIONS

Nagappan et al., "Use of Relative Code Churn Measures to Predict System Defect Density", 2005, ACM.*
Nagappan et al. "Using Software Dependencies and Churn Metrics to Predict Field Failures:An Empirical Case Study", 2007, IEEE.*
Ajila, S., "Software Maintenance: An Approach to Impact Analysis of Objects Change," Software-Practice and Experience, 25(10):1155-1181 (Oct. 1995).
Basili et al., "A Validation of Object-Oriented Design Metrics as Quality Indicators," IEEE Trans. Software Eng, 22 (10):751-761 (1995).
Boehm, B., "Value-Based Software Engineering: Overview and Agenda," Value-Based Software Engineering, pp. 3-14 (2005).
Chidamber et al., "A Metrics Suite for Object Oriented Design," IEEE Trans. Software Eng, 20(6):489-498 (1994).
D'Ambros et al., "An Extensive Comparison of Bug Prediction Approaches," Proceedings of MSR 2010, 7th IEEE Working Conference on Moving Software repositories, pp. 31-41 (2010).
Graves et al., "Predicting Fault Incidence Using Software Change History," IEEE Trans. Software Eng, 26 (7):653-661 (2000).
Hassan, A.E., "Predicting Faults Using the Complexity of Code Changes," Proceedings of ICSE 2009, pp. 181-190 (2008).
Kim et al., "Predicting Faults from Cached History," Proceedings of ICSE 2007, pp. 489-498 (2007).
Knab et al., "Predicting Defect Densities in Source Code Files with Decision Tree Learners," Proc. International Workshop on Mining Software Repositories, pp. 119-125 (2006).
Madhavan et al., "Predicing Buggy Changes Inside an Integrated Development Environment," Proceedings of the 2007 OOPSLA Workshop on Eclipse Technology Exchange, Montreal Canada, Quebec (2007).
Menzies et al., "Data Mining Static Code Attributes to Learn Defect Predictors," IEEE Translations on Software Engineering, 32(11):1-12 (2007).
Moser et al., "A Comparative Analysis of the Efficiency of Change Metrics and Static Code Attributes for Defect Prediction," Proceedings of ICSE 2008, pp. 181-190 (2008).
Nagappan et al., "Change Bursts as Defect Predictors," IEEE 21st International Symposium on Software Reliability Engineering, pp. 309-318 (2010).
Nagappan et al., "Mining Metrics to Predict Component Failures," Proceedings of ICSE 2006 ACM, pp. 452-461 (2006).
Nagappan et al., "Use of Relative Code Churn Measures to Predict System Defect Density," Proceedings of ICSE 2005 ACM, pp. 284-292 (2005).
Ratzinger et al., "Eq-Mine: Predicting Short-Term Defects for Software Evolution," Proceedings of FASE07, pp. 12-26 (2007).
Sarkar et al., "API-Based and Information-Theoretic Metrics for Measuring the Quality of Software Modularization," IEEE Transactions on Software Engineering, 33(1):14-32 (2007).
Sarkar et al., "Metrics for Measuring the Quality of Modularization of Large-Scale Object-Oriented Software," IEEE Transactions on Software Engineering, 34(5):700-720 (2008).
Schroter et al., "Predicting Component Failures at Design Time," Proc. of ACM-IEEE 5th International Symposium on Empirical Software Engineering (2006).
Shivaji et al., "Reducing Features to Improve Bug Prediction," 15th IEEE International Conference on Automated Software Engineering, pp. 600-604 (2009).
Singh et al., "Software Fault Proneness Prediction Using Support Vector Machines," Proceedings of the World Congress on Engineering 2009, vol. I, WCE 2009, Jul. 1-3, 2009, U.K.
Ying et al., "Predicting Source Code Changes by Mining Change History," IEEE Trans. Software Eng., 30(9):574-586 (2004).
Zimmerman et al., "Predicting Defects for Eclipse," Proceedings of Promise 2007, p. 76 (2007).
Zimmerman et al., "Predicting Defects Using Network Analysis on Dependency Graphs," Proceedings of ICSE 2008. (2008).
Subramanyam et al., "Empirical Analysis of CK Metrics for Object-Oriented Design Complexity: Implications for Software Defects," IEEE Transactions on Software Engineering 29(4):297-310 (2003).
Weyuker et al., "Using Developer Information as a Factor for Fault Prediction," Proc. 3rd Intrnational Workshop on Predictor Models in Software Engineering (2007).
Ostrand et al., "Predicting the Location and Number of Faults in Large Software Systems," IEEE Transactions on Software Engineering 31(4):340-355 (2005).

* cited by examiner

METHODS FOR PREDICTING ONE OR MORE DEFECTS IN A COMPUTER PROGRAM AND DEVICES THEREOF

This application claims the benefit of Indian Patent Application Filing No. 3053/CHE/2012, filed Jul. 26, 2012, which is hereby incorporated by reference in its entirety.

FIELD

This technology generally relates to software preventive maintenance and, more particularly, to methods and devices for predicting one or more defects, such as bugs, errors, flaws, mistakes, failures, or faults, in a computer program.

BACKGROUND

Computer programs are increasingly large and complex and evolving over time in order to add or modify features or fix defects affecting the operation of the computer programs. Often such programs are fragile, having many interrelated components and files such that modifications to one portion of the source code results in defects in another portion of the source code. Legacy programs that have been maintained over a relatively long period of time can be relatively difficult to modify due to numerous prior changes, lack of developer first-hand knowledge or adequate experience, poor documentation, inability to perform exhaustive testing, and large size of the source code, for example. While computer program maintenance is a difficult process, defects identified post-release can have significant implications including time and expense required to correct the defects, program unavailability during such corrective action, and a reduction in customer satisfaction.

In order to implement proposed modifications to a computer program, project managers must make personnel decisions in order to allocate developers and testers. It is desirable to allocate personnel intelligently and based on the difficulty and sensitivity of the proposed modifications, such as requiring more experienced developers to handle modification of source code files more likely to contain defects than other files.

However, current methods of identifying source code files that are more likely than other files to contain defects are not effective. Such methods are not universal with respect to the types of source code files and types of legacy computer programs capable of being analyzed, are configured to operate at too low a level to provide useful insight for a project manager, and/or are too heavyweight, requiring significant program analysis with minimal improvement in results.

SUMMARY

A method for generating software test input data includes obtaining, with a program analysis computing apparatus, a version history for a plurality of source code files associated with the computer program. At least one defect probability value is generated, with the program analysis computing apparatus, for each of the plurality of source code files using at least one metric and the obtained version history. One or more of the plurality of source code files having a higher risk of including one or more defects than one or more other of the plurality of source code files are identified, with the program analysis computing apparatus, based on the generated defect probability values. Information regarding each of the one or more identified source code files is output with the program analysis computing apparatus.

An apparatus for generating software test input data includes a processor coupled to a memory and configured to execute programmed instructions stored in the memory including obtaining a version history for a plurality of source code files associated with the computer program. At least one defect probability value is generated for each of the plurality of source code files using at least one metric and the obtained version history. One or more of the plurality of source code files having a higher risk of including one or more defects than one or more other of the plurality of source code files are identified based on the generated defect probability values. Information regarding each of the one or more identified source code files is output.

A non-transitory computer readable having stored thereon instructions for generating software test input data comprising machine executable code which when executed by a processor, causes the processor to perform steps including obtaining a version history for a plurality of source code files associated with the computer program. At least one defect probability value is generated for each of the plurality of source code files using at least one metric and the obtained version history. One or more of the plurality of source code files having a higher risk of including one or more defects than one or more other of the plurality of source code files are identified based on the generated defect probability values. Information regarding each of the one or more identified source code files is output.

This technology provides a number of advantages including methods, non-transitory computer readable medium, and devices that predict computer program defects and identify source code files more likely to contain defects. With this technology, project managers can identify source code files more likely to contain defects and/or more likely to be sensitive or fragile with respect to modifications. As a result, project managers can make more informed and intelligent decisions regarding test prioritization and personnel allocation as well as release readiness of a computer program, for example. Additionally, the number of defects present in post-release computer programs can be reduced and computer program quality can be improved.

DETAILED DESCRIPTION

Figure 1:
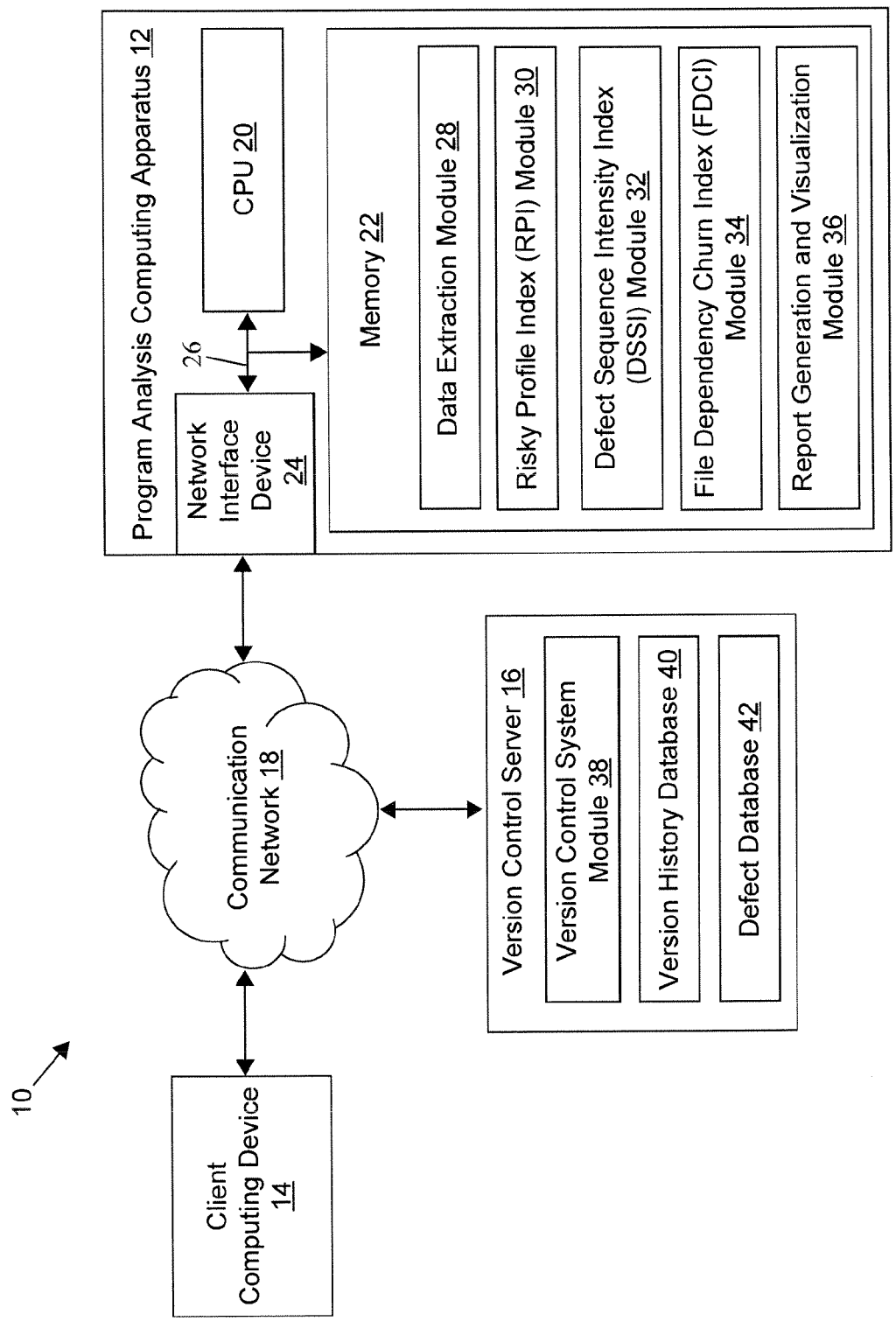
FIG. 1 is a block diagram of a network environment with an exemplary program analysis computing apparatus.
Figure 2:
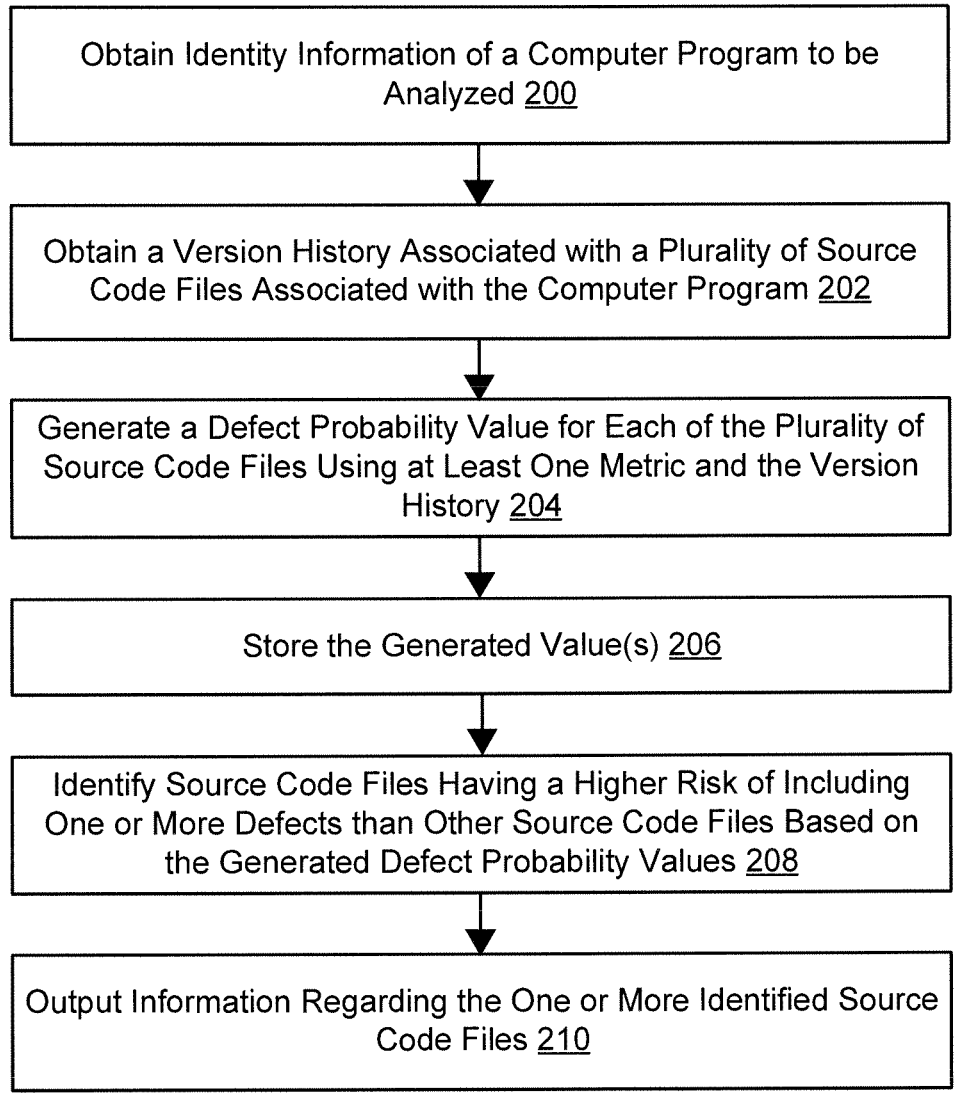
FIG. 2 is a flowchart of an exemplary method for predicting one or more defects in a computer program.

A network environment 10 with an exemplary program analysis computing apparatus 12 is illustrated in FIG. 1. The environment 10 includes the program analysis computing apparatus 12, a client computing device 14, and a version control server 16 coupled together by one or more communication networks 18, although this environment 10 can include other numbers and types of systems, devices, components, and elements in other configurations, such as multiple numbers of each of these apparatuses and devices. This technology provides a number of advantages including methods, non-transitory computer readable medium, and devices that more effectively predict one or more defects in a computer program.

The program analysis computing apparatus 12 includes a central processing unit (CPU) or processor 20, a memory 22, and a network interface device 24 which are coupled together by a bus 26 or other link, although other numbers and types of systems, devices, components, and elements in other configurations and locations can be used. The processor 20 in the program analysis computing apparatus 12 executes a program of stored instructions for one or more aspects of the present technology as described and illustrated by way of the examples herein, although other types and numbers of processing devices and logic could be used and the processor 20 could execute other numbers and types of programmed instructions.

The memory 22 in the program analysis computing apparatus 12 stores these programmed instructions for one or more aspects of the present technology as described and illustrated herein, such as in a data extraction module 28, a risky profile index (RPI) module 30, a defect sequence intensity index (DSSI) module 32, a file dependency churn index (FDCI) module 34, and a report generation and visualization module 36. However, some or all of the programmed instructions can be stored and/or executed elsewhere, such as at the client computing device 14, for example. A variety of different types of memory storage devices, such as a random access memory (RAM) and/or read only memory (ROM) in the program analysis computing apparatus 12 or a floppy disk, hard disk, CD ROM, DVD ROM, or other computer readable medium which is read from and written to by a magnetic, optical, or other reading and writing system that is coupled to the processor 18 in the program analysis computing apparatus 12, can be used for the memory 22.

In this example, the network interface device 24 of the program analysis computing apparatus 12 operatively couples and facilitates communication between the program analysis computing apparatus 12, the client computing device 14, and the version control server 16 via the communications network 18, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and/or SNMP, although other types and numbers of communication networks, such as a direct connection, a local area network, a wide area network, each having their own communications protocols, can be used.

The client computing device 14 can include a central processing unit (CPU) or processor, a memory, a network interface device, and an input and/or display device interface, which are coupled together by a bus or other link, although other numbers and types of network devices could be used. The client computing device 14 may run interface applications that provide an interface to make requests for and send content and/or data to different applications or services provided by the program analysis computing apparatus 12 via the communication network 18.

The version control server 16 can include a central processing unit (CPU) or processor, a memory, a network interface device, and an input and/or display device interface, which are coupled together by a bus or other link, although other numbers and types of network devices could be used. The version control server 16 can include a version control system module 38 for storing version control software configured to facilitate source code file version management using a version history database 40 and/or a defect database 42. In other examples, the version control system module 38, the version history database 40, and/or the defect database 42 are stored in the memory 22 of the program analysis computing apparatus 12. Exemplary versions of the control system module 38 include Apache Subversion (SVN) available from the Apache Software Foundation of Forest Hill, Md. and Concurrent Versions System (CVS) available from Free Software Foundation, Inc. of Boston, Mass., although other types and numbers of the version control system modules could be used.

Although examples of the program analysis computing apparatus 12 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for predicting one or more defects in a computer program using the program analysis computing apparatus 12 will now be described with reference to FIGS. 1-5. In step 200, the program analysis computing apparatus 12 obtains identity information of a computer program to be analyzed. The identity information can be a name or number, for example, identifying a computer program having source code files maintained by the version control system module 38 of the version control server 16. The identify information can be obtained from a user of the program analysis computing apparatus 12 using an input device or from a user of the client computing device 14 using the communication network 18, for example.

At step 202, the data extraction module 28 of the program analysis computing apparatus 12 obtains a version history associated with a plurality of source code files associated with the computer program identified in step 200. The version history can be obtained by the program analysis computing apparatus 12 from the version history database 40, although other manners for obtaining the version history can be used.

In this example, the version history is maintained in storage in the version history database 40 by the version control system module 38 of the version control server 16, although the version history could be maintained and stored in other manners and locations. By way of example only, the version history may include a record of each software developer checking out one or more source code files, modifying the source code files, and checking in the files monitored and recorded by the version control system module 38, although the version control system module 38 can facilitate other interactions.

The process of checking in one or more source code files using the version control system module 38 is referred to as a commit. The version control system module 38 stores information regarding each commit in the version history database 40, including the source code file(s) included in each commit as well as context information including a timestamp, an identifier, and/or a commit message. In some examples, the timestamp indicates the data and time of the commit. The identifier can correspond to a defect stored in the defect database 42 associated with the commit or the identifier can correspond to a transaction or change as established by one of the developers to indicate a code modification not associated with a defect. The commit message includes any text entered by the developer to be associated with the commit (e.g. a narrative explanation of the reason the source code file(s) were modified prior to the commit).

At step 204, the program analysis computing apparatus 12 generates a defect probability value for each of the plurality of source code files using at least one metric and the version history obtained at step 202. The at least one metric can be a risky profile index (RPI) metric, a defect sequence intensity index (DSII) metric, or a file dependency churn index (FDCI) metric, although other types and numbers of metrics could be used. In one example, the at least one metric can be selected by a user of the program analysis computing apparatus 12 or a user of the client computing device 14. In another example, the program analysis computing apparatus 12 is configured to generate defect probability values for each of the plurality of source code files using each of metrics. The defect probability value generated using the RPI, DSII, and FDCI metrics can be generated by the RPI module 30, the DSII module 32, and the FDCI module 34, respectively, as described and illustrated in detail with the examples below with reference to FIGS. 3, 4, and 5, respectively.

Figure 3:
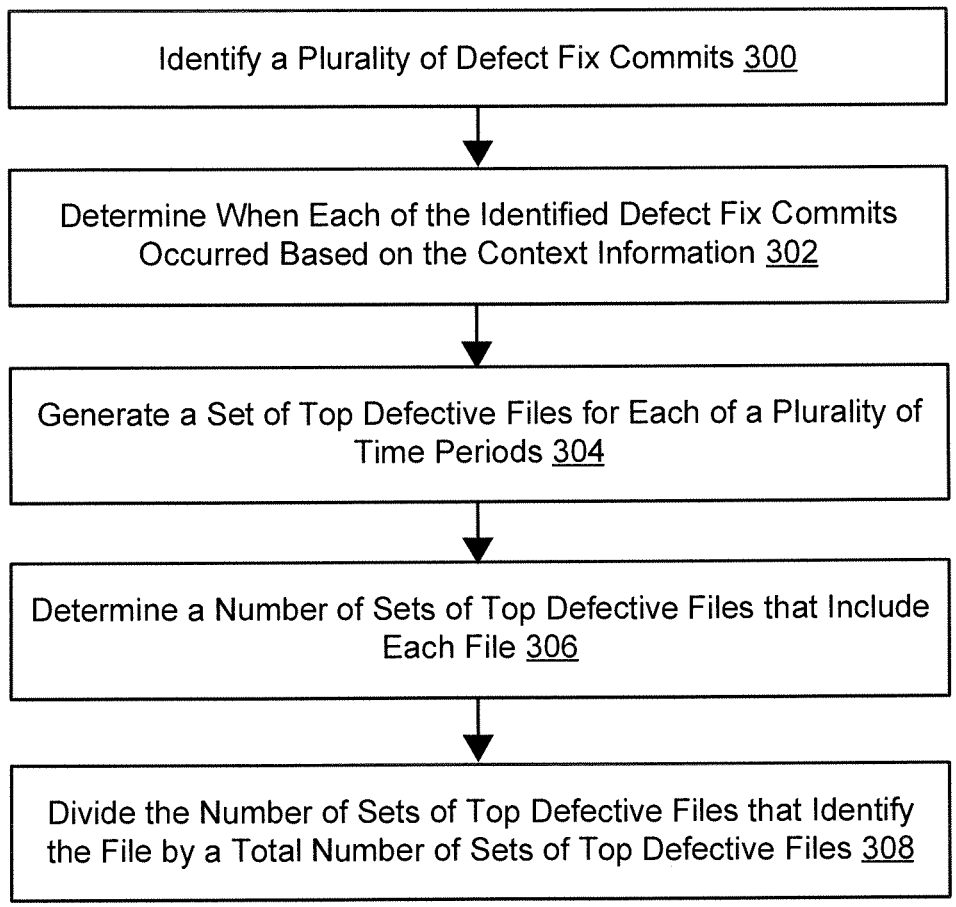
FIG. 3 is a flowchart of an exemplary method for generating a defect probability value using a risky profile index (RPI) metric for one or more source code files.

Referring specifically to FIG. 3, an exemplary method for generating a defect probability value using the RPI metric for each of the plurality of source code files is shown. The RPI metric is a measure of the relative risk that a source code file contains one or more defects based on whether the version history, including historical defect fix commits, indicates the file has frequently been among the top number of defective files during a plurality of historical time periods. Accordingly, if a source code file has historically been among the set of top defective files, it may be more likely to contain a defect.

In order to generate a defect probability value using the RPI metric for each of the plurality of source code files, at step 300, the RPI module 30 of the program analysis computing apparatus 12 identifies a plurality of defect fix commits based on the version history. The defect fix commits are a subset of the commits in which one or more of the source code files associated with the commit was modified prior to the commit in an attempt to fix a defect.

In this example, the RPI module 30 identifies one or more of the defect fix commits by determining whether the identifier included in each of the plurality of commits corresponds to a bug. Accordingly, the identifier stored as associated with each commit can be compared by the RPI module 30 to information contained in the defect database 42 to determine whether the identifier corresponds to a defect. If there is a match of the identifier in the defect database 42, then the commit is a defect fix commit. If there is not a match of the identifier, then the identifier may correspond to a change or transaction indicating the commit was not made as a result of an attempt to fix a defect.

Alternatively, or in combination with analyzing the identifier associated with the commits, the RPI module 30 can apply a regular expression to each commit message associated with the commits based on one or more keywords (e.g. defect, fix, and/or bug). If the regular expression is satisfied, then the commit is a defect fix commit. If the regular expression is not satisfied, then the commit may not be a commit made as a result of an attempt to fix a defect.

At step 302, the RPI module 30 determines when each of the identified defect fix commits occurred based on the context information, such as the timestamp associated with each of the defect fix commits.

At step 304, the RPI module 30 generates a set of top defective files for each of a plurality of time periods. The time periods can be any time period and a yearly time period has been used herein for exemplary purposes only. In this example, each set of top defective files identifies a subset of the plurality of source code files having a number of defect fix commits exceeding a threshold number of defect fix commits during the respective time period. Accordingly, the set of top defective files for year two, for example, identifies all source code files having an associated number of defect fix commits in that year that exceeds a threshold number of defect fix commits.

In one example, the threshold number of defect fix commits is a specific number of defect fix commits. In another example, the threshold number of defect fix commits can be a percentage value. In this example, the source code files having at least one defect fix commit in the specified time period can be ranked by associated number of defect fix commits. Based on the ranking, the files in the top twenty percent, for example, can be included in the set of top defective files for the time period. The threshold number of defect fix commits can be specified by the RPI module 30, as established by a manufacturer, or obtained from a user of the client computing device 14, for example.

Accordingly, the set of top defective files can be expressed as $\text{top}(t) = \{f_i \in g(t) | \forall f_j \in \text{rest}(t) \cdot b(f_i, t) \geq b(f_j, t)\}$, where f represents a file, t represents a time period, g(t) represents the set of source code files having at least one associated defect fix commit in the time period t, b(f,t) represents the total number of defect fix commits associated with file f in time period t, and rest(t) represents the subset of source code files included in the set of source code files represented by g(t) but not included in the set of top defective files represented by top(t). In this example, the size of the set of top defective files represented by top(t) is a proportion of the set of source code files represented by g(t) wherein the proportion is determined based on the threshold number of defect fix commits. Optionally, each set of top defective files top(t) for each time period t can be stored in the memory 22.

At step 306, the RPI module 30 determines, for each file of the plurality of source code files, the number of sets of top defective files that identify each file. Accordingly, the RPI module determines the number of historical time periods during which each file has been among the top defective files.

At step 308, the RPI module 30 divides, for each file of the plurality of source code files, the number of sets of top defective files that identify the file by a total number of sets of top defective files or the total number of time periods. As a set of top defective files is generated for each time period, the total number of sets of top defective files and the total number of time periods are equivalent values in this example.

In one exemplary operation, a source code file has been identified by five sets of top defective files out of a total number of eight sets of top defective files over an eight year period. Accordingly, during five of the eight years the computer program has been maintained, the file has had a number of associated defect fix commits that ranks in the top twenty percent as compared to the number of defect fix commits associated with all other source code files. Therefore, the defect probability value for the file using the RPI metric is 5/8 or 0.625.

Accordingly, the defect probability value for a source code file f generated using the RPI metric can be expressed as:

$$\frac{\sum_{t=1}^{t=n} I_{top(t)}(f)}{n}$$

where n is a number of time periods and $I_{top(t)}(f)$ is an indicator function returning one if the file f is identified by a set of top defective files for one of the time periods top(t) and returning zero otherwise.

Therefore, the defect probability value for each source code file using the RPI metric is bounded between zero and one such that a higher RPI metric value indicates that the file is relatively risky to change because it has relatively more frequently been among the top defective files throughout the analyzed time period. Accordingly, the defect probability values for each of the plurality of source code files generated using the RPI metric are relative indicators of whether a source code file may be more risky than other files and more likely to contain one or more defects, such as due to the file being more complex or for any other reason.

Figure 4:
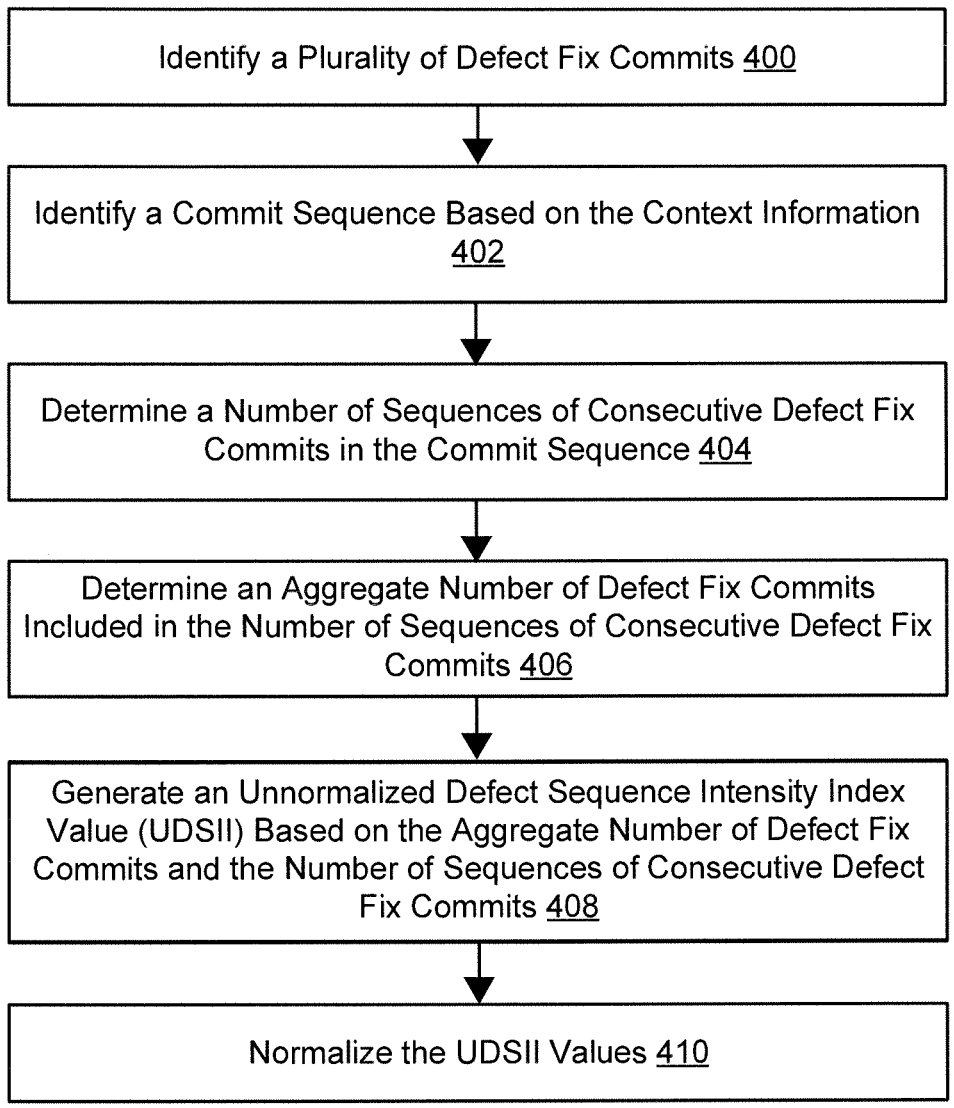
FIG. 4 is a flowchart of an exemplary method for generating a defect probability value using a defect sequence intensity index (DSII) metric for one or more source code files.

Referring specifically to FIG. 4, an exemplary method for generating a defect probability value using the DSII metric for each of the plurality of source code files is shown. The DSII metric is a measure of the relative burstiness of a source code file based on whether the version history, including historical defect fix commits, indicates a plurality of consecutive or clustered defect fix commits. Consecutive defect fix commits are also referred to herein as fix-on-fixes. Accordingly, if a source code file has historically had a relatively high number of fix-on-fixes, it may be more likely to contain a defect.

In order to generate a defect probability values using the DSII metric, at step 400, the DSII module 32 of the program analysis computing apparatus 12 identifies a plurality of defect fix commits as described and illustrated in detail earlier with respect to step 300.

At step 402, the DSII module 32 identifies a commit sequence for each file of the plurality of source code files based on the context information, such as the timestamp associated with each commit. In this example, the commit sequence includes an order of occurrence of each commit for each file based on the timestamp. The commit sequence further includes an indication associated with each commit as to whether the commit was a defect fix commit, as identified in step 400.

At step 404, the DSII module 32 determines, for each file of the plurality of source code files, a number of sequences of consecutive defect fix commits included in the commit sequence. The DSII module 32 then filters the number of sequences of consecutive defect fix commits based on a threshold number of consecutive defect fix commits such that the number of sequences of consecutive defect fix commits includes only those fix-on-fixes having a number of defect fix commits greater than the threshold. Each such sequence of defect fix commits, or fix-on-fixes, including a number of defect fix commits greater than the threshold is also referred to herein as an intensity point.

In one example, the commit sequence C(f) for an exemplary file f is "0011100111110001111100110011" where each number represents a commit and each "1" represents a defect fix commit, although other commit sequence representations can be used. In this example, the threshold number of defect fix commits is two, although any threshold number can be used. Accordingly, the DSII module 32 determines that there are three intensity points or sequences of consecutive defect fix commits including a number of consecutive defect fix commits greater than the threshold of two defect fix commits. The intensity points have a length of 3, 5, and 4 defect fix commits, respectively in order of occurrence in the commit sequence associated with the exemplary file. Of note, the last two sets of consecutive defect fix commits, each indicated by "11" in the commit sequence, are not greater in length than the threshold number of consecutive defect fix commits (two in this example) and therefore are not intensity points.

At step 406, the DSII module 32 determines, for each file of the plurality of source code files, an aggregate number of defect fix commits included in the identified intensity points. Accordingly, in the example described and illustrated earlier, the DSII module 32 determines the aggregate number of defect fix commits as 3+5+4 or 12 total defect fix commits included in all of the intensity points.

At step 408, the DSII module 32 of the program analysis computing apparatus 12 generates an unnormalized defect sequence intensity index value (UDSII) based on the aggregate number of defect fix commits included in the intensity points and the number of intensity points. In this example, the DSII module 32 generates the UDSII value by dividing the aggregate number of defect fix commits by the number of intensity points. Accordingly, in the example described and illustrated earlier, the UDSII is 12/3 or 4 because there are 12 total defect fix commits as determined in step 406 and there are three total relevant sequences or intensity points included in the commit sequence for the exemplary file.

Accordingly, the UDSII for a file f can be expressed as:

$$UDSII = \frac{\sum_{\forall i_{mn} \in I(f)} |i_{mn}|}{|I(f)|}$$

wherein I(f) is the set of all intensity points in the commit sequence and $i_{mn}$ represents an intensity point starting at index m and ending at index n of the commit sequence for the file f.

Optionally, in step 410, the DSII module 32 generates the defect probability value for each file of the plurality of source code files by normalizing the UDSII values. In this example, the DSII module 32 compares each UDSII value associated with each of the plurality of source code files to determine a maximum UDSII value. At step 412, the DSII module 32 of the program analysis computing apparatus 12 divides, for each of the plurality of source code files, the respective UDSII value by the maximum UDSII value thereby generating the defect probability values using the DSII metric.

In examples in which the defect probability values generated using the DSII metric are normalized UDSII values the defect probability values are bounded between zero and one such that a higher associated defect probability value indicates a relatively high defect burstiness. Empirically, it has been shown in the art that defects occur in bursts or are clustered together such that if one version of a source code file has a defect, subsequent versions of the file are relatively more likely to contain one or more defects as well. Accordingly, the defect probability value generated using the DSII metric for each of the plurality of source code files is a relative indicator of the risk that a source code file has one or more defects.

Figure 5:
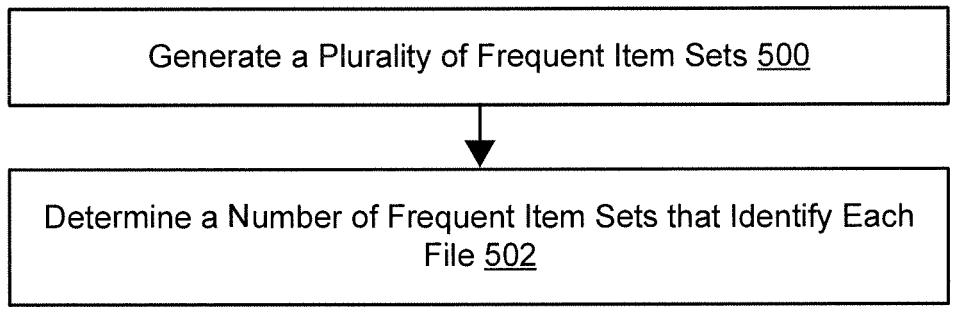
FIG. 5 is a flowchart of an exemplary method for generating a defect probability value using a file dependency churn index (FDCI) metric for one or more source code files.

Referring specifically to FIG. 5, an exemplary method for generating a defect probability value using the FDCI metric is shown. The FDCI metric is a measure of the relative number of implicit dependencies or associations with other source code files. Implicit dependencies are relatively more difficult to identify than explicit dependencies included in the source code. Additionally, a relatively high number of implicit dependencies indicates that one source code file may be related to a number of other source code files such that a change in one or more of the other files may result in a defect in the one file, and the opposite is also true. Accordingly, if a source code file has a relatively high number of implicit dependencies, there may be a higher risk that the file contains one or more defects.

In order to generate a defect probability value using the FDCI metric, at step 500, the FDCI module 34 of the program analysis computing apparatus 12 generates a plurality of frequent item sets. Each frequent item set identifies a plurality of source code files that are frequently committed in the same transaction or in temporal proximity.

In one example, the frequent item sets are determined based on the timestamp included in each of the commits. In this example, a sliding window algorithm can be used to generate the frequent item sets. In another example, the identifier can be used to identify source code files that were committed as one transaction or as related to one transaction or change. Table 1 includes exemplary frequent item sets indicated by a frequent item set identifier which are associated with the plurality of identified files.

TABLE 1

| Frequent Item Set ID | Files |
| --- | --- |
| 1 | 2, 5, 8, 9 |
| 2 | 13, 2, 4, 6 |
| 3 | 3, 6, 2, 11 |
| 4 | 1, 9, 5 |
| 5 | 7, 8, 2 |

Optionally, the FDCI module 34 can generate the plurality of frequent item sets based on a minimum frequency threshold. In this example, a frequent item set is only generated if a plurality of files are committed together a number of times greater than the number of times indicated by the minimum frequency threshold. The minimum frequency threshold can be included in the FDCI module 34, as established by a manufacturer, or obtained by the FDCI module 34 from a user of the client computing device 12, for example. Other frequent item set mining algorithms can also be used to generate the plurality of frequent item sets.

At step 502, the FDCI module 34 of the program analysis computing apparatus 12 determines a number of frequent item sets that identify each source code file. In the example described and illustrated earlier with respect to Table 1, the defect probability value generated using the FDCI metric for file 2 is "4" as file 2 is identified in four frequent item sets (item sets 1-3 and 5). Accordingly, the defect probability value for a file f using the FDCI metric can be expressed as:

$$\sum_{\forall q_i \in Q} Q(q_i, f)$$

where is $Q(q_i, f)$ is an indicator function returning one if the file f is identified by a the frequent item set $q_i$ and returning zero otherwise.

Therefore, a relatively high defect probability value generated using the FDCI metric indicates that a source code file may have a relatively high number of implicit dependencies. Accordingly, defect probability values generated using the FDCI metric are a relative indicator of whether a source code file may be more likely to contain one or more defects due to the likelihood that a change in the file will result in a defect in other files or changes in other files will introduce a defect to the file.

Referring back to FIG. 2, at step 206, the program analysis computing apparatus 12 optionally stores in the memory 22 the generated defect probability value(s), generated using the RPI, DSII, and/or FDCI metric, as associated with each of the plurality of source code files.

At step 208, the program analysis computing apparatus 12 identifies one or more of the plurality of source code files having a higher risk of including one or more defects than one or more other of the plurality of source code files based on the defect probability value. As described and illustrated in more detail above, higher defect probability values generated using one or more of the RPI, DSII, and FDCI metrics indicates an increased likelihood a source code file contains one or more defects.

At step 210, the program analysis computing apparatus 12 outputs information regarding one or more of the plurality of source code files identified in step 208. By identifying and outputting information regarding the source code files having a relatively higher risk of including one or more defects, a project manager can be make a more informed decision about allocating personnel to modify or test the identified files, as well as which files to test or which files to test more thoroughly than other files. Additionally, the aggregate number of source code files having associated defect probability value(s) above a threshold defect probability value for one or more of the metrics may indicate whether a computer program is ready for release or more testing may be required.

Figure 6:
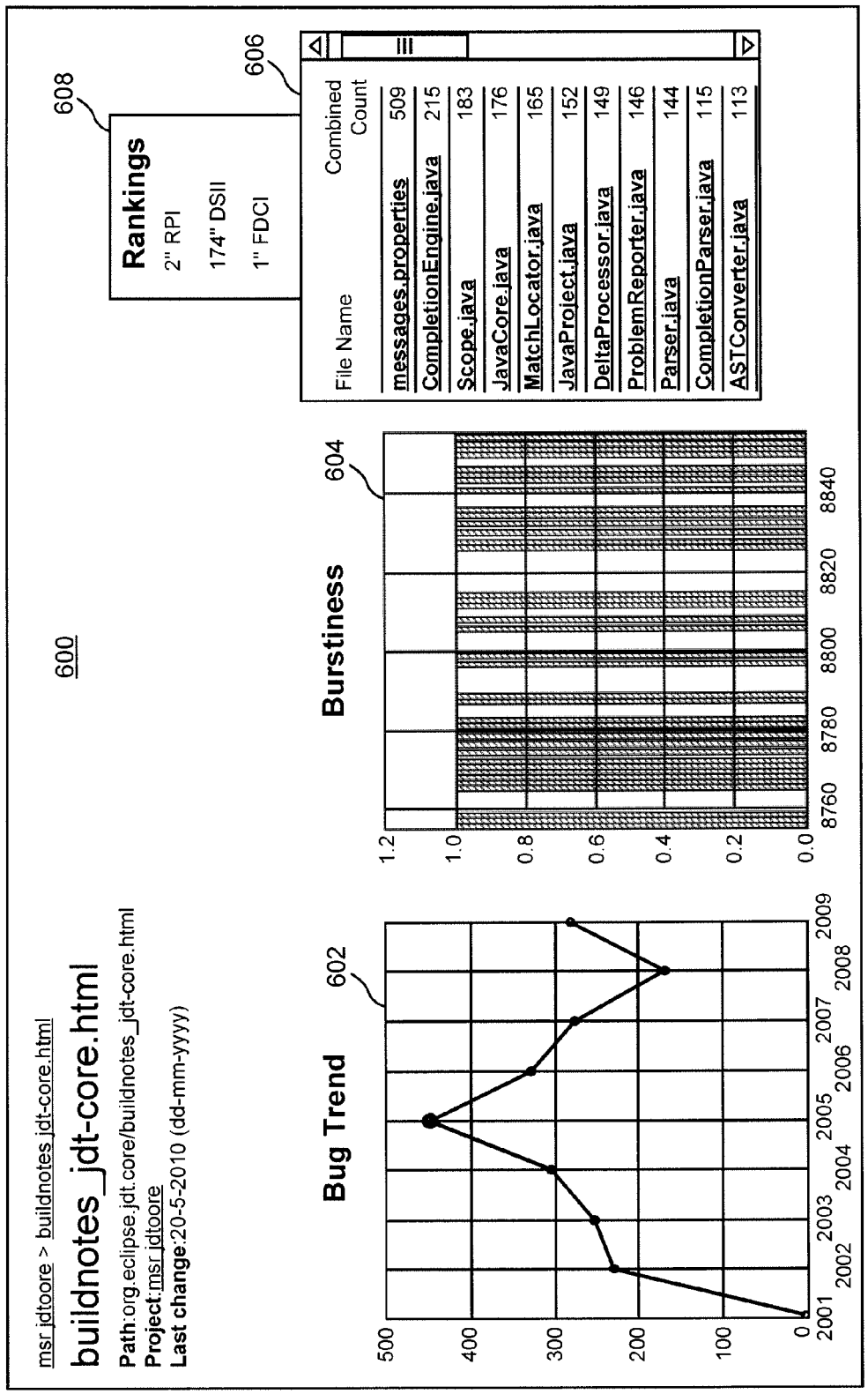
FIG. 6 is a graphical display of an exemplary file dashboard.

Referring specifically to FIG. 6, a graphical display of an exemplary file dashboard 600 is shown. The file dashboard 600 can be accessible by a user of the client computing device 12 using the communication network 18, for example. In this example, the report generation and visualization module 36 generates a file dashboard 600 which can include the defect probability value generated using one or more of the RPI, DSII, or FDCI metrics for at least one file and time period. The analyzed file and time period can be selected by a user of the client computing device 12, for example. In the exemplary file dashboard 600, the defect trend 602 and burstiness 604 graphs show historical defect probability values for the selected buildnotes_jdt-core.html file and historical time period, generated using the RPI and DSII metrics, respectively. Optionally, the file dashboard 600 includes an FDCI pane 606 showing a ranking of the files having the most implicit dependencies with the selected buildnotes_jdt-core.html file.

Also optionally, the file dashboard 600 can include a rankings pane 608 including rank value(s) indicating the rank of the selected file based on the defect probability value(s) associated with the selected file and the defect probability value(s) associated with all of the other source code files. In the exemplary file dashboard 600, the selected buildnotes_jdt-core.html file has the second highest defect probably value generated using the RPI metric, the $174^{th}$ highest defect probably value generated using the DSII metric, and the highest defect probably value generated using the FDCI metric among the plurality of source code files of the computer program. Other file dashboards including other information in other graphical displays can also be used.

Figure 7:
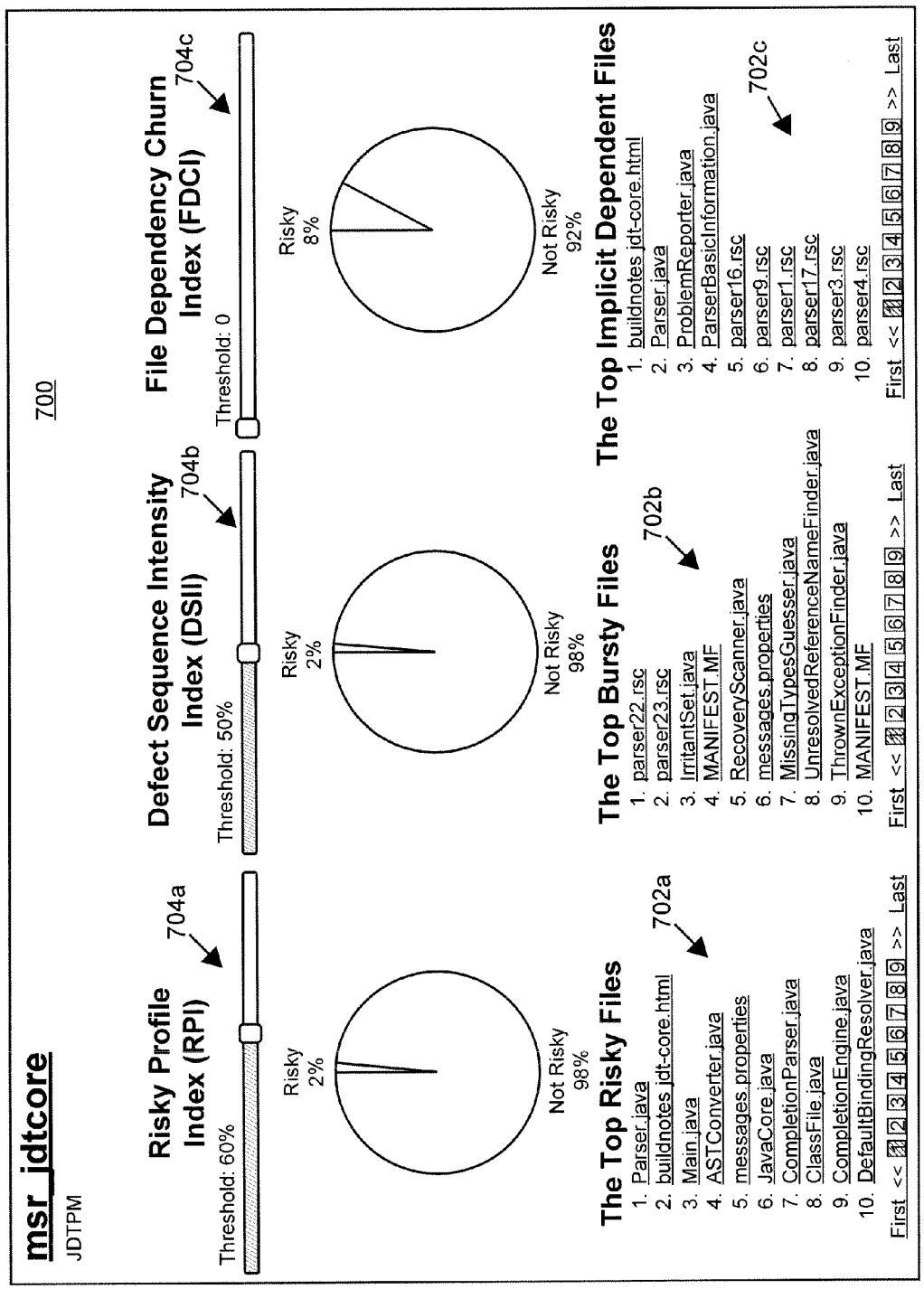
FIG. 7 is a graphical display of an exemplary project dashboard.

Referring specifically to FIG. 7, a graphical display of an exemplary project dashboard 700 is shown. The project dashboard 700 can be accessible by a user of the client computing device 12 using the communication network 18, for example. In this example, the report generation and visualization module 36 generates a project dashboard 700 which can include an identification of at least a subset of the source code files identified in step 208. In the exemplary project dashboard 700, the top risky, bursty, and implicitly dependent files are shown in lists 702a-c and ordered based on the defect probability values generated using the RPI, DSII, and FDCI metrics, respectively.

Optionally, the project dashboard 700 includes one or more threshold indicators 704a-c associated with one or more of the RPI, DSII, and/or FDCI metrics and configured to, when manipulated, graphically display a percentage of the plurality of source code files having an increased risk of including one or more defects based on a threshold. In this example, the threshold indicator(s) 704a, 704b, 704c, can be configured to manipulate a threshold defect probability value corresponding to each of the metrics such that the percentage of source code files having defect probability values, generated using each of the metrics, higher than the threshold value is displayed.

By this technology, more effective defect prediction metrics can be generated that are relatively lightweight, universally applicable with respect to version control software and file type, and informative predictors of computer program defects. As a result, the defect probability values generated using one or more metrics can be utilized by program managers to more intelligently allocate resources for modifying source code files to include additional features or to fix identified defects, generate testing procedures, and/or determine when a computer program is ready for release, for example. Thereby, resources can be more effectively utilized and computer program quality can be improved.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for predicting one or more defects in a computer program, comprising:
    obtaining, by a program analysis computing apparatus, a version history for a plurality of source code files associated with the computer program;
    generating, by the program analysis computing apparatus, at least one defect probability value for each of the plurality of source code files using at least one metric and the version history, wherein the version history includes a plurality of commits of each of the plurality of source code files to a version control system and each of the commits includes context information including at least one of a timestamp, a source code file identifier, or a commit message and the at least one metric is selected from a risky profile index (RPI) metric, a defect sequence intensity index (DSII) metric, or a file dependency churn index (FDCI) metric;
    identifying, by the program analysis computing apparatus, one or more of the plurality of source code files having a higher risk of including one or more defects than one or more other of the plurality of source code files based on the generated defect probability values;
    identifying, by the program analysis computing apparatus, a plurality of defect fix commits including determining at least one of when the identifier included in each of the plurality of commits corresponds to a defect or when the application of a regular expression to the commit message of each of the plurality of commits results in a match; and
    outputting, by the program analysis computing apparatus, information regarding each of the one or more identified source code files.

2. The method of claim 1, wherein the at least one metric is a risky profile index (RPI) metric and the generating at least one defect probability value further comprises:
    determining when each of the identified defect fix commits occurred based on the context information;
    generating a set of top defective files for each of a plurality of time periods, wherein each set of top defective files identifies a subset of the plurality of source code files having a number of defect fix commits exceeding a threshold number of defect fix commits during a respective one of the plurality of time periods;
    determining for each file of the plurality of source code files a number of sets of top defective files that identify the file; and
    dividing for each file of the plurality of source code files the number of sets of top defective files that identify the file by a total number of sets of top defective files.

3. The method of claim 1, wherein the at least one metric is a defect sequence intensity index (DSII) metric and the generating at least one defect probability value further comprises:
    identifying a commit sequence for each file of the plurality of source code files based on the context information;
    determining for each file of the plurality of source code files a number of sequences of consecutive defect fix commits in the commit sequence including a number of consecutive defect fix commits greater than a threshold number of defect fix commits;
    determining for each file of the plurality of source code files an aggregate number of defect fix commits included in the number of sequences of consecutive defect fix commits including a number of consecutive defect fix commits greater than the threshold number of consecutive defect fix commits;
    dividing for each file of the plurality of source code files the aggregate number of defect fix commits by the number of sequences of consecutive defect fix commits including a number of consecutive defect fix commits greater than a threshold number of defect fix commits to generate an unnormalized defect sequence intensity index value (UDSII);
    comparing each UDSII to determine a maximum UDSII; and
    dividing for each file of the plurality of source code files, a respective UDSII by the maximum UDSII.

4. The method of claim 1, wherein the at least one metric is a file dependency churn index (FDCI) metric and the generating at least one defect probability value further comprises:

generating a plurality of frequent item sets based on one or more of the identifier or the timestamp included in the one or more commits and a minimum frequency threshold, wherein each frequent item set identifies a subset of the plurality of source code files wherein each subset of the plurality of source code files includes source code files that are frequently committed in the same transaction or in temporal proximity; and determining for each file of the plurality of source code files a number of frequent item sets that identify the file.

5. The method of claim 1 wherein the outputting further comprises generating one or more of a file or a project dashboard wherein:

the project dashboard includes one or more of:
a graphical display including an identification of at least a subset of the identified one or more of the plurality of source code files; or
a threshold indicator configured to, when manipulated by a user, indicate a corresponding percentage of the plurality of source code files having an increased probability of including one or more defects; and the file dashboard includes a graphical display including one or more of the value for the at least one metric for a selected file and a specified time period or a rank value based on the value for the at least one metric for the selected file and the specified time period.

6. A non-transitory computer readable medium having stored thereon instructions for predicting software defects comprising machine executable code which when executed by a processor, causes the processor to perform steps comprising:

obtaining a version history for a plurality of source code files associated with the computer program;

generating at least one defect probability value for each of the plurality of source code files using at least one metric and the version history, wherein the version history includes a plurality of commits of each of the plurality of source code files to a version control system and each of the commits includes context information including at least one of a timestamp, a source code file identifier, or a commit message and the at least one metric is selected from a risky profile index (RPI) metric, a defect sequence intensity index (DSII) metric, or a file dependency churn index (FDCI) metric;

identifying one or more of the plurality of source code files having a higher risk of including one or more defects than one or more other of the plurality of source code files based on the generated defect probability values;

identifying a plurality of defect fix commits including determining at least one of when the identifier included in each of the plurality of commits corresponds to a defect or when the application of a regular expression to the commit message of each of the plurality of commits results in a match; and outputting information regarding each of the one or more identified source code files.

7. The medium of claim 6 wherein the at least one metric is a risky profile index (RPI) metric and the generating at least one defect probability value further comprises:

determining when each of the identified defect fix commits occurred based on the context information;

generating a set of top defective files for each of a plurality of time periods, wherein each set of top defective files identifies a subset of the plurality of source code files having a number of defect fix commits exceeding a threshold number of defect fix commits during a respective one of the plurality of time periods;

determining, for each file of the plurality of source code files, a number of sets of top defective files that identify the file; and dividing, for each file of the plurality of source code files, the number of sets of top defective files that identify the file by a total number of sets of top defective files.

8. The medium of claim 6 wherein the at least one metric is a defect sequence intensity index (DSII) metric and the generating at least one defect probability value further comprises:

identifying a commit sequence for each file of the plurality of source code files based on the context information;

determining, for each file of the plurality of source code files, a number of sequences of consecutive defect fix commits in the commit sequence including a number of consecutive defect fix commits greater than a threshold number of defect fix commits;

determining, for each file of the plurality of source code files, an aggregate number of defect fix commits included in the number of sequences of consecutive defect fix commits including a number of consecutive defect fix commits greater than the threshold number of consecutive defect fix commits;

dividing, for each file of the plurality of source code files, the aggregate number of defect fix commits by the number of sequences of consecutive defect fix commits including a number of consecutive defect fix commits greater than a threshold number of defect fix commits to generate an unnormalized defect sequence intensity index value (UDSII);

comparing each UDSII to determine a maximum UDSII; and dividing, for each file of the plurality of source code files, the respective UDSII by the maximum UDSII.

9. The medium of claim 6 wherein the at least one metric is a file dependency churn index (FDCI) metric and the generating at least one defect probability value further comprises:

generating a plurality of frequent item sets based on one or more of the identifier or the timestamp included in the one or more commits and a minimum frequency threshold, wherein each frequent item set identifies a subset of the plurality of source code files wherein each subset of the plurality of source code files includes source code files that are frequently committed in the same transaction or in temporal proximity; and determining, for each file of the plurality of source code files, a number of frequent item sets that identify the file.

10. The medium of claim 6 wherein the outputting further comprises generating one or more of a file or a project dashboard wherein:

the project dashboard includes one or more of:
a graphical display including an identification of at least a subset of the identified one or more of the plurality of source code files; or
a threshold indicator configured to, when manipulated by a user, indicate a corresponding percentage of the plurality of source code files having an increased probability of including one or more defects; and the file dashboard includes a graphical display including one or more of the value for the at least one metric for a selected file and a specified time period or a rank value based on the value for the at least one metric for the selected file and the specified time period.

11. A program analysis computing apparatus, comprising:
a processor coupled to a memory and configured to execute programmed instructions stored in the memory comprising:

obtaining a version history for a plurality of source code files associated with the computer program;

generating at least one defect probability value for each of the plurality of source code files using at least one metric and the version history, wherein the version history includes a plurality of commits of each of the plurality of source code files to a version control system and each of the commits includes context information including at least one of a timestamp, a source code file identifier, or a commit message and the at least one metric is selected from a risky profile index (RPI) metric, a defect sequence intensity index (DSII) metric, or a file dependency churn index (FDCI) metric;

identifying one or more of the plurality of source code files having a higher risk of including one or more defects than one or more other of the plurality of source code files based on the generated defect probability values;

identifying a plurality of defect fix commits including determining at least one of when the identifier included in each of the plurality of commits corresponds to a defect or when the application of a regular expression to the commit message of each of the plurality of commits results in a match; and outputting information regarding each of the one or more identified source code files.

12. The apparatus of claim 11 wherein the at least one metric is a risky profile index (RPI) metric and the generating at least one defect probability value further comprises:

determining when each of the identified defect fix commits occurred based on the context information;

generating a set of top defective files for each of a plurality of time periods, wherein each set of top defective files identifies a subset of the plurality of source code files having a number of defect fix commits exceeding a threshold number of defect fix commits during a respective one of the plurality of time periods;

determining, for each file of the plurality of source code files, a number of sets of top defective files that identify the file; and dividing, for each file of the plurality of source code files, the number of sets of top defective files that identify the file by a total number of sets of top defective files.

13. The apparatus of claim 11 wherein the at least one metric is a defect sequence intensity index (DSII) metric and the generating at least one defect probability value further comprises:

identifying a commit sequence for each file of the plurality of source code files based on the context information;

determining, for each file of the plurality of source code files, a number of sequences of consecutive defect fix commits in the commit sequence including a number of consecutive defect fix commits greater than a threshold number of defect fix commits;

determining, for each file of the plurality of source code files, an aggregate number of defect fix commits included in the number of sequences of consecutive defect fix commits including a number of consecutive defect fix commits greater than the threshold number of consecutive defect fix commits;

dividing, for each file of the plurality of source code files, the aggregate number of defect fix commits by the number of sequences of consecutive defect fix commits including a number of consecutive defect fix commits greater than a threshold number of defect fix commits to generate an unnormalized defect sequence intensity index value (UDSII);

comparing each UDSII to determine a maximum UDSII; and dividing, for each file of the plurality of source code files, the respective UDSII by the maximum UDSII.

14. The apparatus of claim 11 wherein the at least one metric is a file dependency churn index (FDCI) metric and the generating at least one defect probability value further comprises:

generating a plurality of frequent item sets based on one or more of the identifier or the timestamp included in the one or more commits and a minimum frequency threshold, wherein each frequent item set identifies a subset of the plurality of source code files wherein each subset of the plurality of source code files includes source code files that are frequently committed in the same transaction or in temporal proximity; and determining, for each file of the plurality of source code files, a number of frequent item sets that identify the file.

15. The apparatus of claim 11 wherein the outputting further comprises generating one or more of a file or a project dashboard wherein:

the project dashboard includes one or more of:

a graphical display including an identification of at least a subset of the identified one or more of the plurality of source code files; or a threshold indicator configured to, when manipulated by a user, indicate a corresponding percentage of the plurality of source code files having an increased probability of including one or more defects; and the file dashboard includes a graphical display including one or more of the value for the at least one metric for a selected file and a specified time period or a rank value based on the value for the at least one metric for the selected file and the specified time period.

* * * * *